Figure 1:
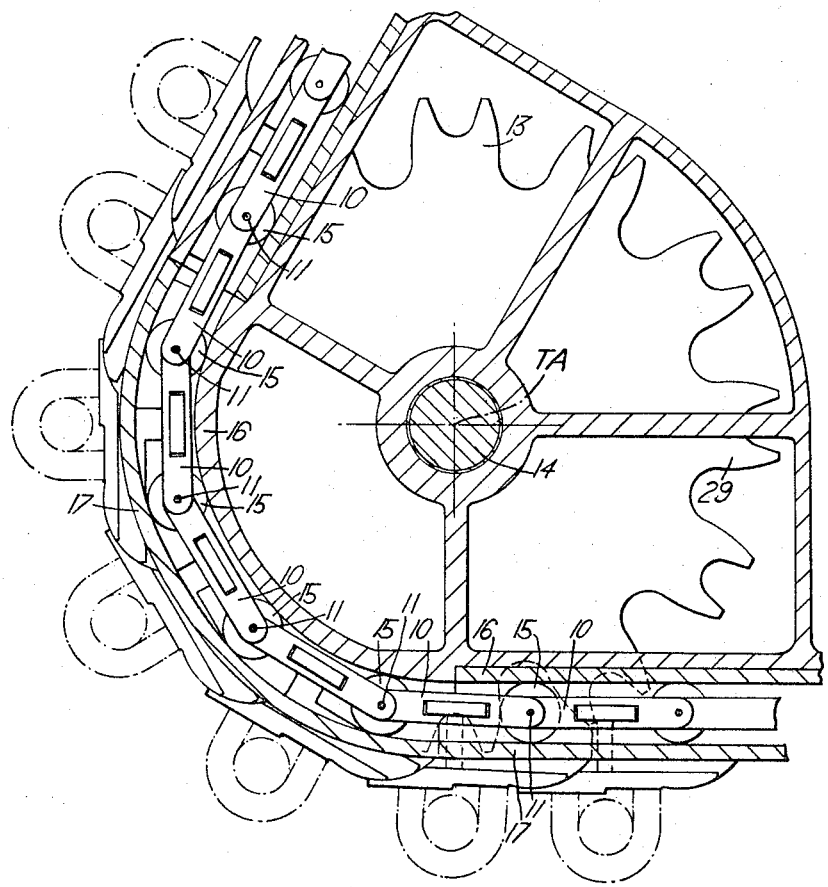

April 18, 1967   J. T. FRANEK ETAL   3,314,526
ENDLESS CHAIN CONVEYORS
Filed April 13, 1965   6 Sheets-Sheet 1

JOZEF T. FRANEK
FREDERICK PRICE

Inventors

By *Imrie & Smiley*

Attorneys

JOZEF T. FRANEK
FREDERICK PRICE

April 18, 1967

J. T. FRANEK ETAL
ENDLESS CHAIN CONVEYORS 3,314,526

Filed April 13, 1965

6 Sheets-Sheet 4

JOZEF T. FRANEK
FREDERICK PRICE

Inventors

By *Imirie & Smiley*

Attorneys

April 18, 1967  J. T. FRANEK ETAL  3,314,526
ENDLESS CHAIN CONVEYORS

Filed April 13, 1965  6 Sheets-Sheet 6

JOZEF T. FRANEK
FREDERICK PRICE

Inventors

By *Imrie & Smiley*

Attorneys

United States Patent Office 3,314,526
Patented Apr. 18, 1967

3,314,526
ENDLESS CHAIN CONVEYORS
Jozef Tadeusz Franek and Frederick Price, London, England, assignors to The Metal Box Company Limited, London, England, a British company
Filed Apr. 13, 1965, Ser. No. 447,820
Claims priority, application Great Britain, Apr. 22, 1964, 16,742/64
4 Claims. (Cl. 198—137)

This invention relates to long pitch endless chain conveyors driven by rotatable sprockets co-operating therewith.

As is well understood inherent features, as well as disadvantages, of endless chain conveyors are those of varying distance between the supporting sprockets if the chain is to be kept tightly tensioned, of non-uniform linear velocity along straight linear sections, and of cyclic tightness and slackness in the chain if the distance between the driving sprockets is constant accompanied by non-uniform velocity. The polygonal arrangement assumed by the links as they pass around the axis of rotation of the driving sprocket causes the velocity of the chain to vary along straight linear sections while the length of the linear sections also varies as each link is engaged by a tooth of the driving sprocket.

If the chain pitch is relatively small and the number of driving sprocket teeth is relatively high then the variation in the linear velocity of the chain is negligible. However, it is often necessary to use endless chain conveyors having a relatively long pitch, such conveyors being used in instances where chain simplicity and a small number of moving parts is needed or in instances where the conveyor is to carry a considerable load or mass on a precisely determined path, and it may be found that the effect of the polygonal arrangement assumed by the links can impose serious limitations on the performance of such conveyors. An example of this latter instance is the use of chain conveyors in canneries where the conveyors are used for carrying numbers of filled cans.

It is a main object of the present invention to provide an endless chain conveyor having a relatively long pitch and which can be moved at a substantially constant linear velocity along straight linear sections thereof while being driven by sprockets rotating with constant angular velocity, at the same time maintaining constant tension along the straight linear sections independently of the position of the driving sprockets.

Figure 2:
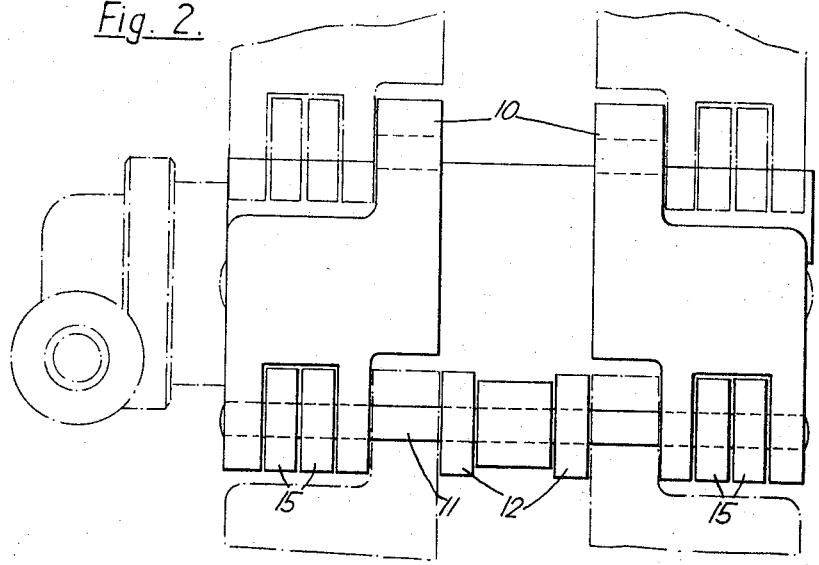
Figure 3:
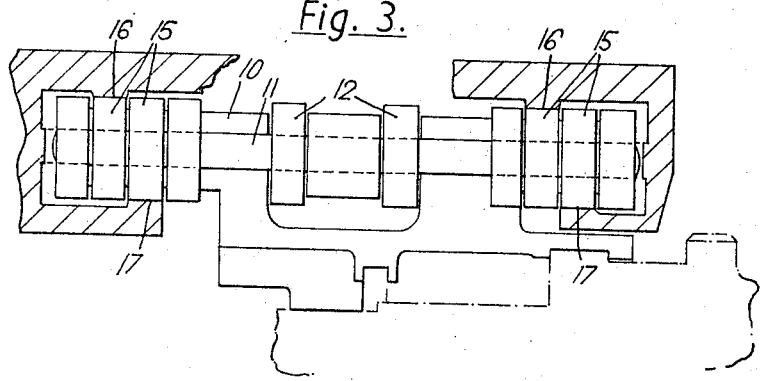
Figure 4:
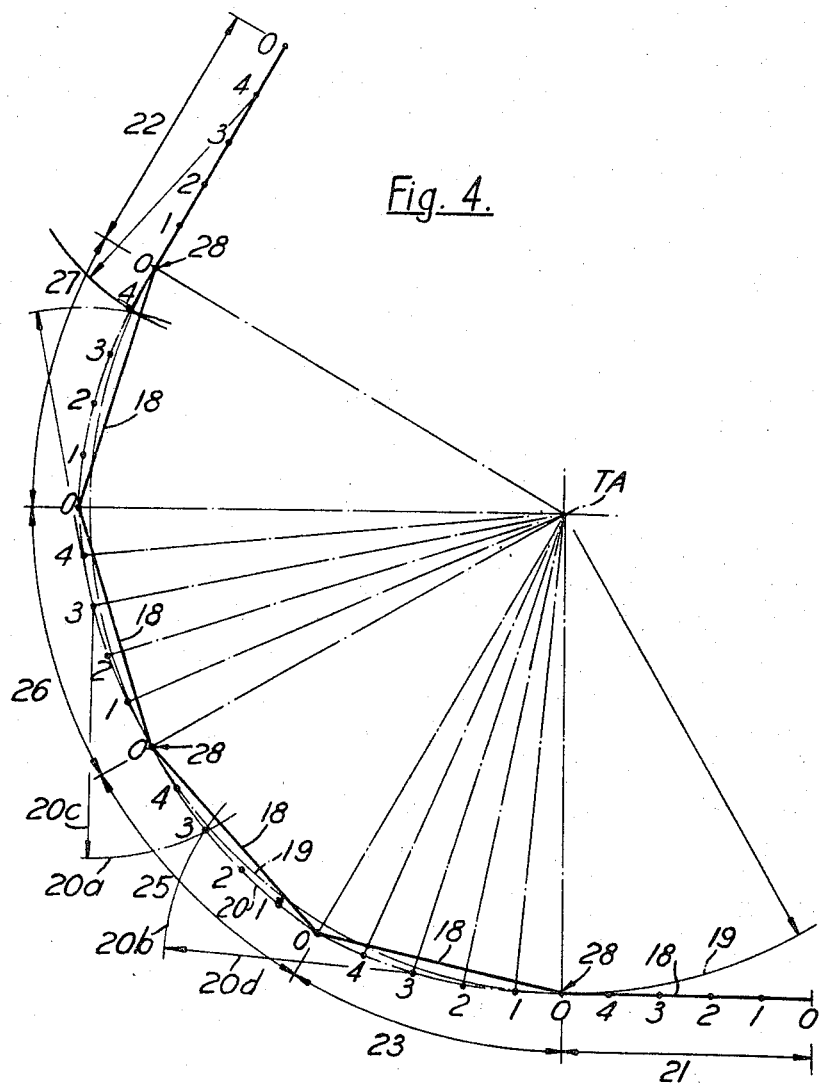
Figure 5:
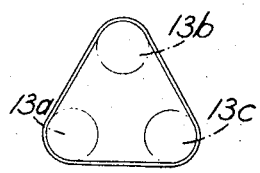
Figure 7:
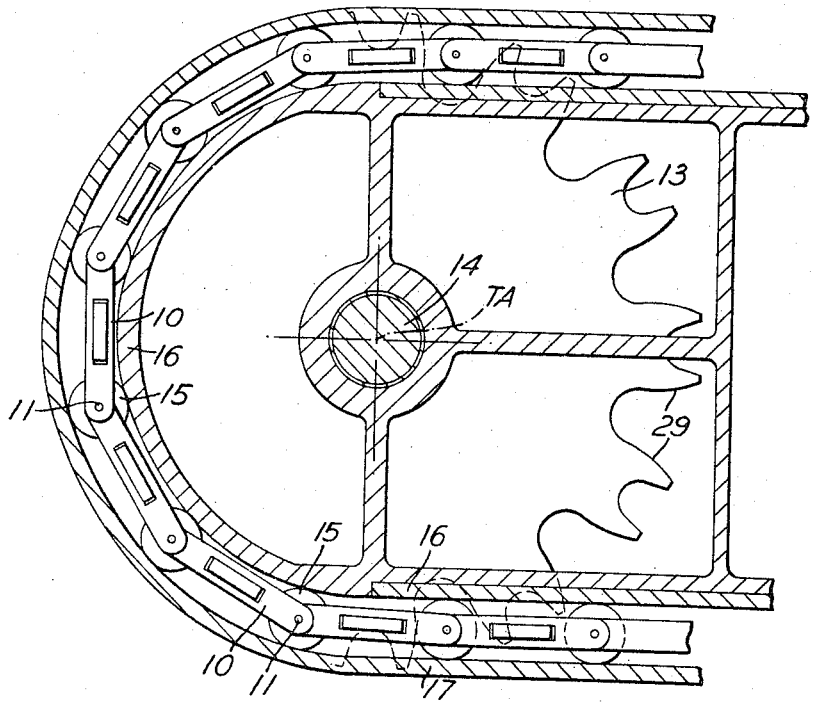
Figure 8:
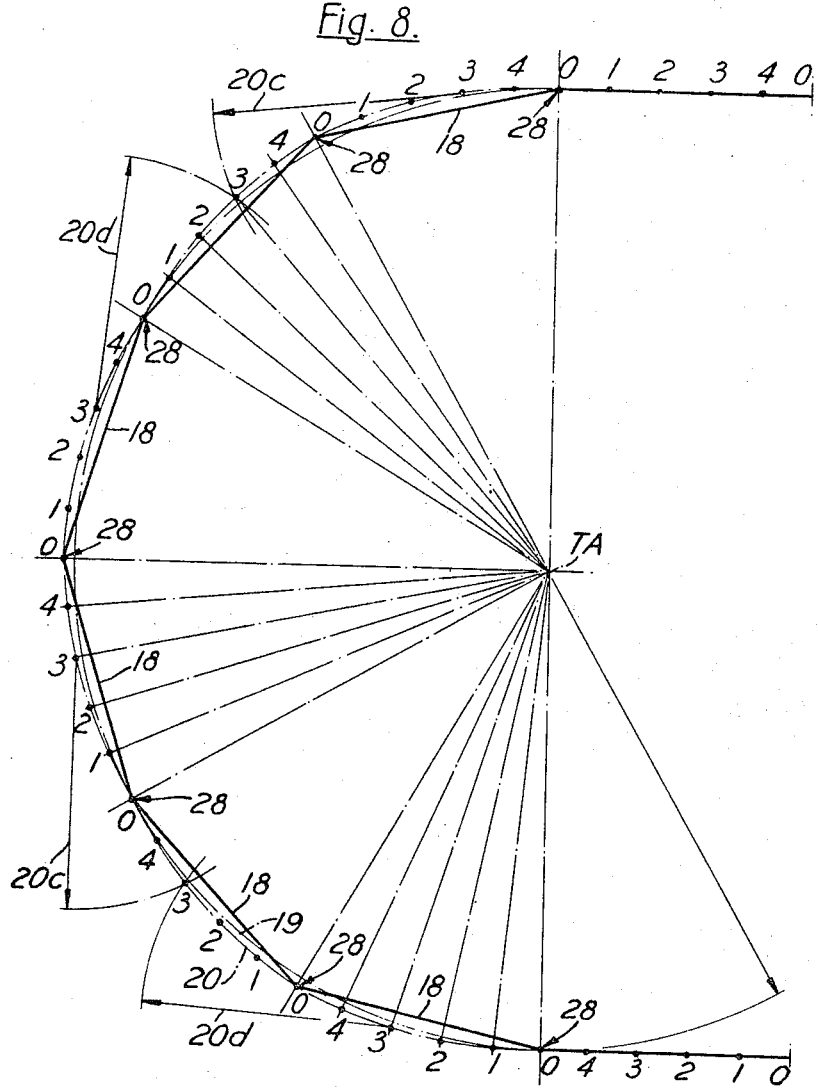
Figure 9:
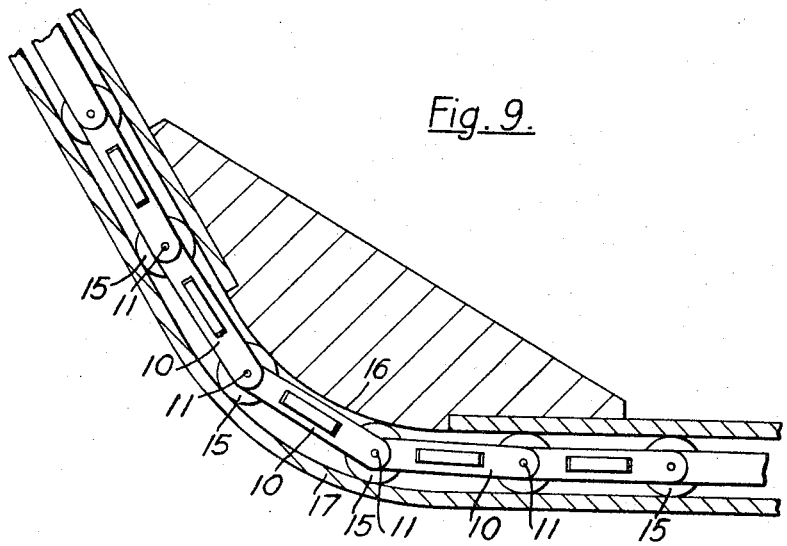
Figure 10:
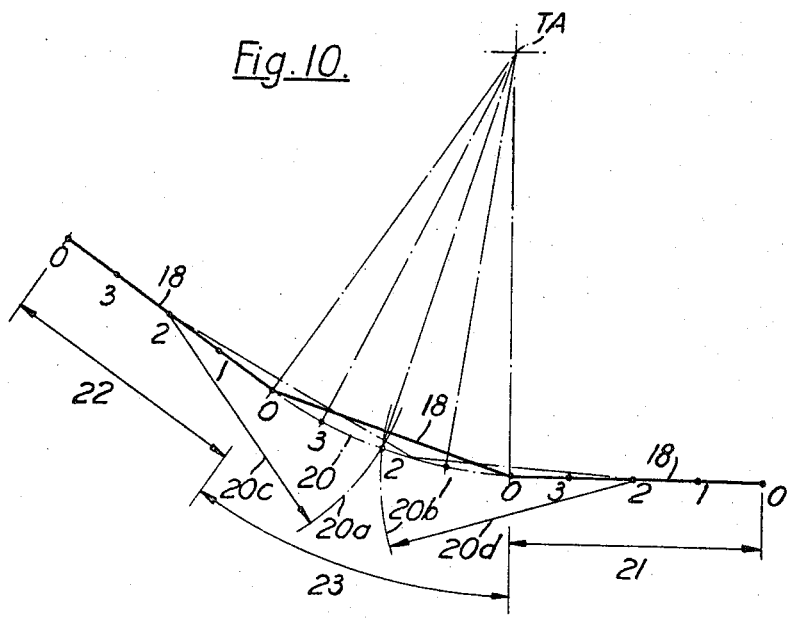

In order that the invention may be clearly understood embodiments thereof will now be described, by way of example, with reference to the accompanying drawings, in which:

FIG. 1 is a sectional elevation of a part of an endless chain conveyor according to the invention, FIG. 2 is a top plan of a single link of the chain, FIG. 3 is a section illustrating the co-operation of the chain with guide elements therefor, FIG. 4 is a diagrammatic illustration of the mode of operation of the conveyor, FIG. 5 illustrates diagrammatically an endless conveyor including the part thereof shown in FIG. 1, FIGS. 6 to 8 illustrate a conveyor having a path alternative to that of FIG. 5, and FIGS. 9 and 10 illustrate a part of a conveyor according to the invention in which stationary cam elements co-operate with the chain at a part thereof remote from sprockets which define the path of the chain.

In the drawings like references indicate like or similar parts.

Referring to FIGS. 1 to 4 of the drawings, the endless conveyor comprises a chain formed by rigid links 10 of which the opposite ends of each link are connected by pivot pins 11 one to an end of the preceding link and one to an end of the succeeding link. Each link at a position intermediate the opposite ends thereof supports roller means 12, FIGS. 2 and 3, which are rotatable about the pivot pins 11 and are engageable by the teeth of a rotatable driving sprocket 13 as described below. The sprocket 13 is rotatable with a shaft 14, FIG. 1.

Guide elements co-operate with the links while the chain is changing direction about a fixed turning axis which, as shown in FIG. 1, is the axis TA of rotation of sprocket 13. The guide elements have contoured faces engageable by the rollers 12 to move the axes of the pivot pins for each link 10 in a path which deviates from one concentric with the turning axis TA so that the chain is maintained in a taut condition while passing round the driving sprocket and that the varying velocities of the pivot pins while passing round the driving sprocket result in substantially uniform velocity of the straight linear portions of the chain. The guide elements comprise cam followers 15 mounted on the pivot pins 11 and stationary cam elements 16, 17 which co-operate with the cam followers.

FIG. 4 illustrates the mode of operation of the conveyor and in this figure it is assumed that the pitch 18 of the pivot pins is five inches. With the arrangement as shown in FIG. 4 the centres of a pair of pivot pins 11 subtend an angle of 30° at the axis of rotation of the sprocket 13 the pitch line of which is indicated at 19. The deviating path traversed by the centres of the pivot pins 11 is indicated by the line 20 which, for each link, is marked with a like number of equi-spaced reference positions 0 to 4 each of which is struck by an arc 20a, 20b of five inches radius 20c, 20d from the preceding and succeeding positions of like reference, that is from the like reference positions of connected links. Thus from FIG. 4 it will be seen that during movement of a link about the axis of rotation of the sprocket the radial distance of the pivot pins of the link from said axis is varied in a manner such that the links are kept taut and ensure that the linear velocity of the links along the straight stretches 21, 22 of the chain is substantially uniform. To facilitate the construction of the cam elements 16, 17 and to deviate as little as possible from the pitch circle 19 it is assumed that the pivot pins 11 move along stretch 23, FIG. 4, with constant angular velocity satisfying at the same time the condition of uniform velocity of the trailing pivot pin of a link moving along the straight linear stretch 21. Again, for reasons of simplicity, the path of a pivot pin 11 along the stretch 23 is repeated along the stretch 26. The path of a pivot pin 11 along stretch 25 is determined by using points along stretch 23 and along stretch 26. The path of a pivot pin along stretch 27 is determined by using points along stretch 26 and along the stretch 22.

It will also be noted that the roller means 12 is fully engaged by teeth of the sprocket only at those positions where, as indicated at 28, the pitch line of the sprocket is coincident with the line 20 traversed by the centres of the pivot pins. Further, the shape of the cam elements 16, 17 is such that they maintain the chain in a taut condition about the sprocket and result in the constant linear velocity of the chain along the stretches 21 and 22. The continuous and uninterrupted drive is provided by the driving sprocket 13 engaging rollers 12 along the straight linear stretches 21, 22. The tooth flanks 29, FIG. 1, of the sprocket 13 are of involute shape suitably generated so that when they are in contact with the rollers 12 the velocity of the chain along the straight stretches thereof is uniform.

The arrangement described with reference to FIGS. 1 to 4 is a part of an endless conveyor having a substantially triangular track shape as diagrammatically illustrated in FIG. 5, the path of the chain being defined by toothed sprockets 13a, 13b, 13c, any of which may be a driving sprocket, and stationary cams being provided at each of the positions at which the chain changes direction and being operative over an angle of about 120°.

Figure 6:
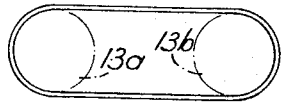

FIGS. 6 to 8 illustrate an alternative embodiment of the invention in which the endless chain passes around two sprockets 13a, 13b, FIG. 6, one of which is a driving sprocket, which define the path of the chain, said path including two parallel track portions. In this embodiment of the invention the sprockets and co-operating cam elements co-operate over an angle of about 180°. The stationary cams are provided at each of the positions at which the chain changes direction.

FIGS. 9 and 10 illustrate another alternative embodiment of the invention in which the chain changes direction at a position at which it is not engaged by a sprocket but is retained in a taut condition while moving around the turning axis TA, by the co-operation of the rollers 15 with stationary cam elements so as to maintain the constant uniform velocity of the chain along the straight linear stretches of the chain. The chain does, however, also co-operate with sprockets, including a driving sprocket, and further cam elements, as above described, at a position not shown in FIGS. 9 and 10.

A line drawn between the centres of the pivot pins 11 of each link 10 subtends with the turning axis TA an angle which can be divided into equal parts as shown in FIGS. 4, 8, and 10. As shown in the drawings this angle is an angle of 30° but it is to be understood that, if desired, this angle may be other than 30°, for example it may be 45°, or 60°, or 90°.

We claim:

1. An endless conveyor including a long link chain comprising a series of links of which the opposite ends of each link are connected by pivot pins one to an end of the preceding link and one to an end of the succeeding link, a drive sprocket over which said chain is trained, said sprocket having a pitch circle of predetermined diameter along which said pivot pins would normally be carried as the chain passes around the sprocket, a roller carried by each pivot pin, and a stationary guide member having a curved outer surface adjacent said sprocket and with which said rollers engage as the chain passes around said sprocket, said sprocket and said curved outer surface of said guide member having a common turning axis so that the teeth of said sprocket engage said pivot pins throughout the length of the path defined by the chain as it passes around the sprocket, the roller engaging face of said guide member having a contour defined by a series of intersecting arcs each of which is of a radius less than the pitch radius of said sprocket and in which the points of intersection of the arcs are displaced inwardly of said pitch circle of the sprocket.

2. The endless conveyor defined in claim 1 wherein said teeth of the sprocket have flanks of involute shape.

3. The endless conveyor defined in claim 2 wherein said points at which the arcs intersect are separated to be simultaneously arrived at by those pivot pins at the remote ends of adjacent links.

4. The endless conveyor defined in claim 1 wherein said points at which the arcs intersect are separated to be simultaneously arrived at by those pivot pins at the remote ends of adjacent links.

References Cited by the Examiner

UNITED STATES PATENTS

| 2,512,356 | 6/1950 | Massiello | 198—138 |
| 3,062,358 | 11/1962 | Woodward | 198—137 |

FOREIGN PATENTS

| 435,214 | 9/1935 | Great Britain. | |

EVON C. BLUNK, *Primary Examiner.*

M. L. AJEMAN, *Assistant Examiner.*